United States Patent [19]

Coleman

[11] Patent Number: 4,981,016

[45] Date of Patent: Jan. 1, 1991

[54] MASTER CYLINDER DIP STICK

[75] Inventor: John R. Coleman, Dayton, Ohio

[73] Assignee: General Motors Corporation, Detroit, Mich.

[21] Appl. No.: 440,635

[22] Filed: Nov. 24, 1989

[51] Int. Cl.⁵ .......................... B60T 11/26; F15B 7/08
[52] U.S. Cl. ..................................... 60/585; 33/722;
    73/61 R; 73/61.1 R; 116/227
[58] Field of Search ................. 60/533, 562, 585, 588;
    33/722, 277, 53; 116/227; 73/290 R, 304 R,
    298, 53, 61 R, 61.1

[56] References Cited

U.S. PATENT DOCUMENTS

| | | | |
|---|---|---|---|
| 1,658,774 | 2/1928 | Taub . | |
| 1,774,439 | 8/1930 | Holtson . | |
| 3,448,618 | 6/1969 | Lomolino | 73/327 |
| 3,568,628 | 3/1971 | Erickson | 116/118 |
| 3,745,659 | 7/1973 | Hsu | 33/722 |
| 3,763,706 | 10/1973 | Hubby | 73/452 |
| 3,796,098 | 3/1974 | Trayer | 73/327 |
| 4,331,185 | 5/1982 | Rinaldo et al. | 141/95 |
| 4,622,851 | 11/1986 | Wilson | 73/292 |
| 4,720,998 | 1/1988 | Hogue | 73/61 R |
| 4,746,338 | 5/1988 | Williams | 55/275 |
| 4,761,886 | 8/1988 | Wilson et al. | 33/126.7 |

Primary Examiner—John T. Kwon
Assistant Examiner—Thomas Denion
Attorney, Agent, or Firm—Charles E. Leahy

[57] ABSTRACT

A dipstick in the brake fluid reservoir of a brake system of the type having one or more pistons carrying a seal of elastomeric material subject to swelling upon exposure to the presence of a foreign fluid other than brake fluid. A piece of elastomeric material of the same type as the elastomeric material of the piston seal is mounted on the dip stick at a level thereon to be consistently submerged in the brake fluid whereby the presence of the seal swelling foreign fluid in the brake fluid reservoir will be detectable by examination of the piece of elastomeric material upon removal of the dip stick from the reservoir.

5 Claims, 1 Drawing Sheet

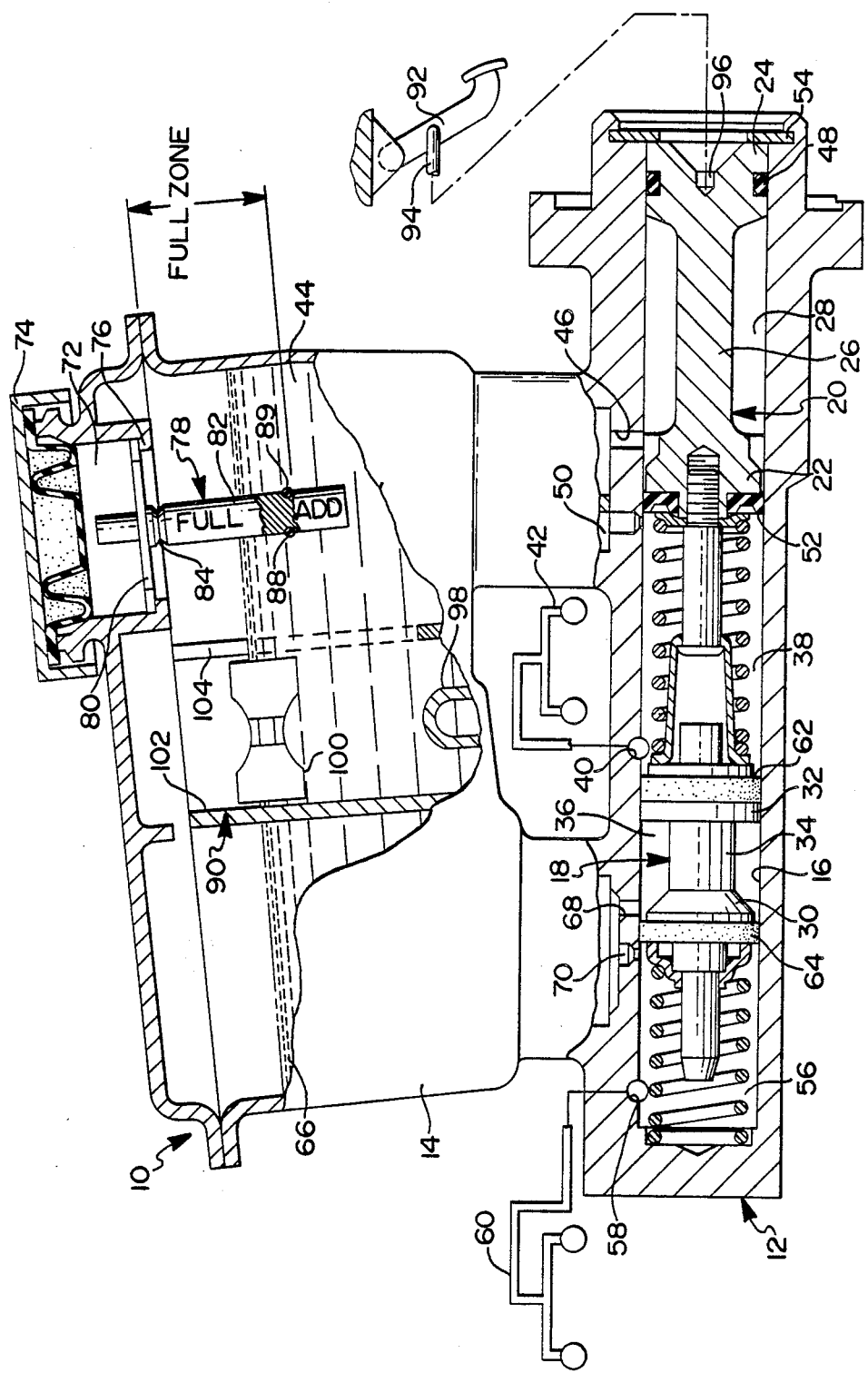

MASTER CYLINDER DIP STICK

The invention relates to a dip stick for a master cylinder reservoir and more particularly provides an indicator of the presence of a foreign fluid in the master cylinder reservoir.

BACKGROUND OF THE INVENTION

Motor vehicle hydraulic brake systems include a master cylinder having a piston which reciprocates in a cylinder bore to pressurize a brake fluid. A brake fluid reservoir communicates with the cylinder bore to provide additional brake fluid as required. The typical brake fluid reservoir has a fill line or indicator to designate the level the brake fluid shall not be filled beyond.

The master cylinder piston in such brake systems typically carries an elastomeric seal which seals the piston to the cylinder bore. The entry of a foreign fluid into the brake fluid may cause the piston seal to swell. Likewise, the wheel brakes have wheel cylinders with pistons which carry elastomeric seals. The wheel brake pistons seals may also swell in the presence of a foreign fluid.

It would be desirable to provide an indicator of the presence of such a foreign fluid in the brake fluid.

SUMMARY OF THE INVENTION

This invention provides a dip stick in the brake fluid reservoir of a brake system of the type having one or more pistons carrying a seal of elastomeric material subject to swelling upon exposure to the presence of a foreign fluid other than brake fluid. A piece of elastomeric material of the same type as the elastomeric material of the piston seal is mounted on the dip stick at a level thereon to be consistently submerged in the brake fluid whereby the presence of the seal swelling foreign fluid in the brake fluid reservoir will be detectable by examination of the piece of elastomeric material upon removal of the dip stick from the reservoir.

One object, feature and advantage of the invention is an easy means for determining if a foreign fluid has been added to the master cylinder reservoir.

Another object, feature and advantage of the invention is an easy means for detecting the swelling of seals in the brake system.

A further object, feature and advantage of the invention resides in the mounting of a piece of elastomeric seal material on the dip stick so as to be consistently submerged in the brake fluid whereby the presence of the seal swelling foreign fluid in the brake fluid reservoir will be detectable by examination of the piece of elastomeric material upon removal of the dip stick from the reservoir.

Further objects, features and advantages of the present invention will become more apparent to those skilled in the art as the nature of the invention is better understood from the accompanying drawing and detailed description.

BRIEF DESCRIPTION OF THE DRAWINGS

FIG. 1 is a sectional view of the master cylinder and reservoir of this invention showing the dip stick located in the reservoir.

DESCRIPTION OF THE PREFERRED EMBODIMENT

A master cylinder assembly 10 has a master cylinder 12 and a reservoir 14. The master cylinder 12 has a bore 16 of uniform diameter. Since the master cylinder is shown in FIG. 1 as being of the dual circuit type, it is provided with a forward piston 18 and a rear piston 20. The rear piston 20 is the primary piston, and has a forward piston head 22 reciprocally received in the center segment of the bore 16 and a rear piston head 24 reciprocally received in aft section of the bore 16. The piston heads 22 and 24 are joined by a reduced diameter section 26 which defines a chamber 28 between the piston heads 22 and 24.

The forward piston 18 is the secondary piston and is reciprocally received in the bore 16. The forward piston 18 has a forward piston head 30 and a rear piston head 32. The piston heads 30 and 32 are joined by a reduced diameter section 34 which defines a chamber 36 between the piston heads. A high pressure pressurizing chamber 38 is defined by the bore 16, the forward piston head 22 of the primary piston 20, and the rear piston head 32 of the secondary piston 18. A outlet 40 is provided in the master cylinder 12 to deliver brake fluid pressurized in the chamber 38 to a first brake circuit 42.

The chamber 28 between the piston heads 22 and 24 is a compensation chamber which is continually connected to a brake fluid reservoir chamber 44 of reservoir 14 through a compensation port 46. A filler port 50 provides communication between the pressurizing chamber 38 and the reservoir chamber 44 when the secondary piston is in the fully released position as shown in FIG. 1, so that a cup seal 52 carried by piston head 22 uncovers the port 50. A seal 48 is mounted on the piston head 24 to seal the rear end of the chamber 28. A piston stop 54 is provided in the open end of the bore 16 and forms an abutment engaged by the piston head 24 when the master cylinder is in the fully released position.

Another high pressure pressurizing chamber 56 is defined by the piston head 30 of the secondary piston 18 and the forward end of bore 16. An outlet 58 is provided in the master cylinder 12 to deliver brake fluid from the pressurizing chamber 56 to a second brake circuit 60. A cup seal 64 carried by the forward piston head 30 will prevent fluid flow from the pressurizing chamber 56 past the piston head 30. A cup seal 62 carried by the rear piston head 32 will prevent flow from the chamber 38 past the rear piston head 32 into the chamber 36.

The chamber 36 between the piston heads 30 and 32 of the secondary piston 18 is a compensation chamber which is continually connected to a brake fluid reservoir chamber 66 of reservoir 14 through a compensation port 68. A filler port 70 provides communication between the pressurizing chamber 56 and the reservoir chamber 66 when the secondary piston is in the fully released position as shown in FIG. 1, so that the cup seal 64 uncovers the filler port 70.

The reservoir 14 has a throat 72 where fluid may be added. A cover 74 is installed over the throat 72 to protect the brake fluid in the reservoir 14. The dip stick 78 has a flange 80 which rests on a lip 76 of the throat 72. The dip stick 78 has a rod portion 82 which projects into the brake fluid. The rod portion 82 has a groove or marking 84 to indicate the upper limit of a full zone. An "O" ring 88 indicates the lower limit of the full zone and is secured by a snug fit within a groove 89 on the rod portion 82 of the dip stick 78. The "O" ring 88 is made of an elastomeric material similar to that of the seals 48, 52, 62 and 64 in the master cylinder 12, such as 70 durometer EPDM (Ethylene-propylene terpolymer). There are similar elastomeric material seals in the brake circuits 42 and 60.

In the embodiment shown, the reservoir 14 has a sensing device 90, that indicates when the fluid level drops below the full region. The fluid level sensing device 90 has a magnet float 100 which floats in a cylinder 102 mounted in the reservoir 14. The cylinder 102 has a pair of guides, not shown, to position the magnet float 100 as it floats in the brake fluid. The cylinder 102 has a slot 104 which allows the fluid within the cylinder 102 to communicate with the rest of reservoir 14. The fluid level sensor 90 is located above a divider 98 interposed between the two reservoir chambers 44 and 66. The divider 98 assures that if one of the circuits 42 or 60 loses fluid it will not result in total loss of fluid in the other circuit's reservoir. The slot 104 that allows the fluid in the cylinder 102 to communicate with the rest of the reservoir 14 extends down to the level of the divider 98. A magnet reading device, not shown, is mounted within the divider 98 and is activated when the magnet float 100 drops to a certain distance above of the magnet reading device due to a drop in fluid level. The magnet reading device is connected electrically to a signal device, not shown, which is either an audible or visual indicator, such as buzzer. The "O" ring 88 which indicates the bottom of the full region on the dip stick 78 is at the same brake fluid level or slightly above the level at which the sensing device 90 turns on the signal device.

When a brake pedal 92 is applied a push rod 94 engages a rear end 96 of the primary piston 20. Movement of the pistons 20 and 18 seal the pressurizing chambers 38 and 56 off from the reservoir chambers 44 and 66 by closing the filler ports 50 and 70. The brake fluid is pressurized and goes through the outlets 40 and 58 to the brake circuit 42 and 60 connected with the respective outlet.

Under normal operation, the fluid in the reservoir 14 will remain at a relatively constant level, subject to slight variations in the level as the result of changes in temperature. As the brake linings wear, the wheel cylinders will progressively draw fluid from the reservoir. The reservoir is sized to contain adequate fluid to replenish the wheel cylinder during this normal wear without the fluid level falling below the lower limit of the full zone. However, the fluid level in the reservoir 14 will drop in the event of leakage in the brake circuits 42 and 46. In regular maintenance, the dip stick 78 is checked to determine if fluid must be added.

With several other fluid reservoirs located in close proximity to the brake fluid reservoir 14, occasionally the wrong fluid is added to the reservoir 14. For example, transmission fluid, power steering fluid, motor oil or ethylene glycol base antifreeze may be mistakenly added to the reservoir 14. Usually these foreign fluids float on top of brake fluid because of the specific gravity of the liquid. Since the master cylinder 12 draws fluid from the bottom of reservoir 14 through the compensation ports 46 and 68 and the filler ports 50 and 70, the foreign fluid will not enter the master cylinder 12 immediately.

If the foreign fluid gets low enough in the reservoir 14, it will make contact with the "O" ring 88 which is located on the dip stick 78 causing the "O" ring 88 to swell. The next time the dip stick 78 is removed from the reservoir 14, it will be readily indicated by the swelled "O" ring 88 that there is a foreign fluid in the reservoir 14. Without the "O" ring 88, the foreign fluid could only be detected by a person who can distinguish the two fluids on the stick or that the fluid on the dip stick is not brake fluid. The foreign fluid can be removed from the reservoir 14, in most situations without having to flush out or replace the brake circuits 42 and 60.

Thus the inventions provides an easy means for determining if a foreign fluid has been mistakenly added to the master cylinder reservoir. This is accomplished by removing of the dip stick from the reservoir. The "O" ring carried by the dip stick will have been consistently submerged in the brake fluid whereby the presence of the seal swelling foreign fluid in the brake fluid reservoir will be detectable by examination of the "O" ring.

While an embodiment of the present invention has been explained, various modification within the spirit and scope of the following claims will be readily apparent to those skilled in the art.

The embodiments of the invention in which an exclusive property or privilege is claimed are defined as follows:

1. In a vehicle brake system of the type having a brake fluid reservoir and one or more pistons carrying a seal of elastomeric material subject to swelling upon exposure to the presence of a foreign fluid other than brake fluid, the improvement comprising:
   a dip stick removably mounted in the brake fluid reservoir;
   and a piece of elastomeric material of the same type as the elastomeric material of the piston seal mounted on the dip stick at a level thereon to be consistently submerged in the brake fluid whereby the presence of the seal swelling foreign fluid in the brake fluid reservoir will be detectable by examination of the piece of elastomeric material upon removal of the dip stick from the reservoir.

2. In a vehicle brake system of the type having a brake fluid reservoir and one or more pistons carrying a seal of elastomeric material subject to swelling upon exposure to the presence of a foreign fluid other than brake fluid, the improvement comprising:
   a dip stick removably mounted in the brake fluid reservoir and having indices thereon to indicate the level of brake fluid stored in the reservoir, said dip stick having a circumferential extending groove therein at a level thereon to be consistently submerged in the brake fluid;
   and an O-ring of elastomeric material of the same type as the elastomeric material of the piston seal mounted in the circumferential extending groove of the dip stick whereby the presence of the seal swelling foreign fluid in the brake fluid reservoir will be detectable by examination of the piece of elastomeric material upon removal of the dip stick from the reservoir.

3. In a vehicle brake system of the type having a brake fluid reservoir and one or more pistons carrying a seal of elastomeric material subject to swelling upon exposure to the presence of a foreign fluid other than brake fluid, the improvement comprising:
   a reservoir container having a throat for adding the brake fluid;
   the throat having a lip;

a dip stick removably located in the reservoir container having a flange to sit on the lip to position the dip stick in the throat;

a marking on the dip stick to indicate when the reservoir is full; and an elastomeric material located on the dip stick that will swell the elastomeric material when it makes contact with a foreign fluid.

4. A master cylinder reservoir as in claim 3 wherein; the elastomeric material is located on the dip stick at the marking that indicates the lower limit of the full region of the reservoir.

5. A master cylinder reservoir as in claim 3 wherein; the master cylinder reservoir has a detachable cover that is not attach to the dip stick and fits over the throat.

* * * * *